United States Patent [19]

Karlstetter

[11] Patent Number: 4,754,345
[45] Date of Patent: Jun. 28, 1988

[54] ADDITIONAL MEMORIES STORING SUBSTANTIAL INFORMATION

[75] Inventor: Dieter Karlstetter, Augsburg, Fed. Rep. of Germany

[73] Assignee: Siemens Aktiengesellschaft, Berlin and Munich, Fed. Rep. of Germany

[21] Appl. No.: 700,754

[22] Filed: Feb. 12, 1985

[51] Int. Cl.⁴ .......................... G11B 5/09; G11B 15/18
[52] U.S. Cl. ...................................... 360/49; 360/72.1
[58] Field of Search .................... 360/72.1, 72.2, 49, 360/53

[56] References Cited

U.S. PATENT DOCUMENTS

| | | | |
|---|---|---|---|
| 3,863,228 | 1/1975 | Taylor | 360/53 |
| 4,227,220 | 10/1980 | Brown et al. | 360/72.1 |
| 4,498,146 | 2/1985 | Martinez | 364/900 |

FOREIGN PATENT DOCUMENTS 0150111  9/1983  Japan ...................... 360/49

*Primary Examiner*—Vincent P. Canney

[57] ABSTRACT

A storage method for a storage device used in a telecommunication system, in particular a telephone exchange system provides that a memory, e.g. a magnetic disk memory, is formatted with a plurality of storage elements such as storage sectors of standard storage volume in which, by a selectable number of storage elements, storage sections of specified size are formed by storage elements which are co-related in respect of their drive and can be driven individually successively by addresses. Reserve storage sections are provided on the magnetic disk and are protected from direct access. In the event of a defect in a storage element, a reserve storage element is assigned thereto in that the drive address of the reserve storage element is stored for the defective storage element, as a result of which, during the individual successive drive of the storage elements of a storage section containing a defective storage element, when the latter is reached, the assigned reserve storage element is included in the drive cycle and is subjected to a write/read/erasure process in place of the defective storage element.

5 Claims, 1 Drawing Sheet

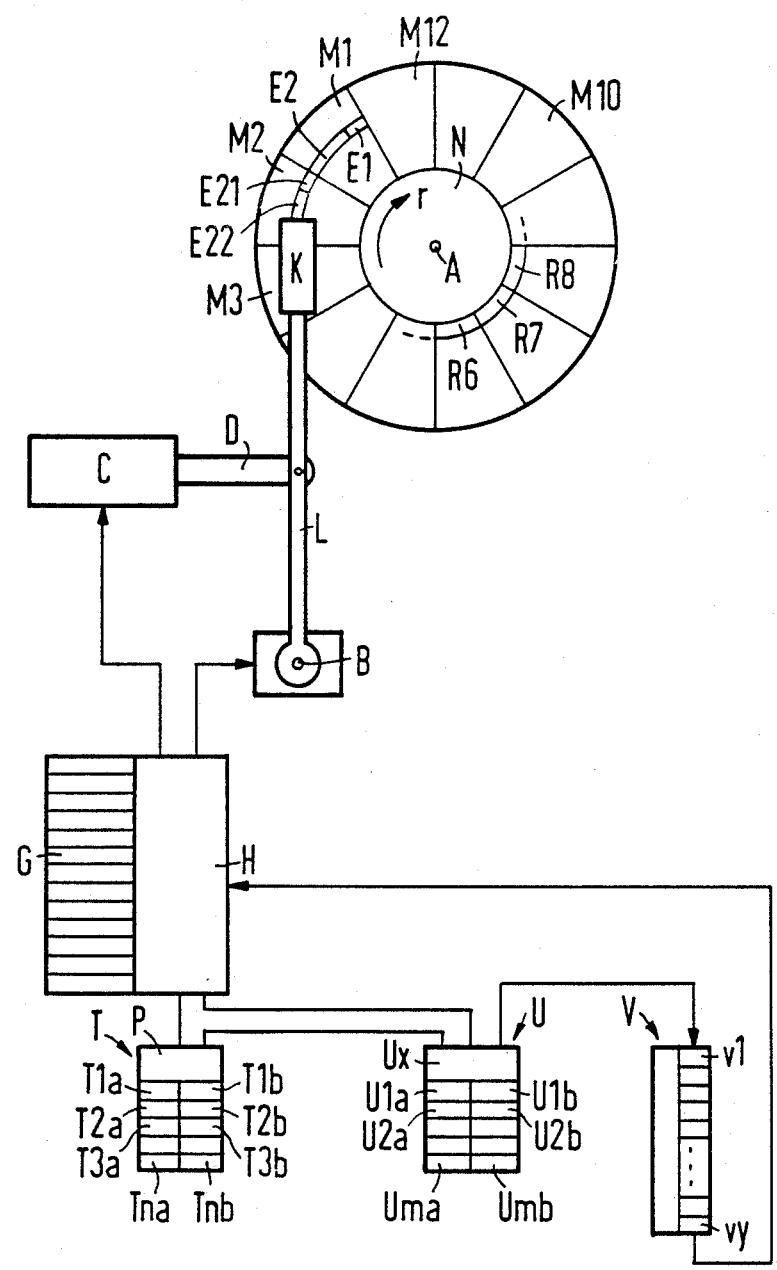

ADDITIONAL MEMORIES STORING SUBSTANTIAL INFORMATION

BACKGROUND OF THE INVENTION

1. Field of the Invention

The present invention relates to a method of storage for a storage device used in telecommunication system, in particular telephone exchange systems, in which at least one overall memory is provided which is constructed for formatting from a plurality of storage elements, e.g. storage sectors, of standard storage volume, e.g. a magnetic disk for magnetic disk memories. By way of a selectable number of storage elements, storage sections of specified size are formed from storage elements which are related in terms of their drive and which can be successively individually driven by way of addresses. Reserve storage elements contained in a reserve section of the overall memory are protected from, i.e. excluded from a direct access which serves to form the storage sections which are related in terms of drive. In the event of a defect in a storage element, the same is assigned a reserve storage element in that the selection addresses of the reserve storage element is stored for the defective storage element, as a result of which, during the individual successive drive of the storage elements of a storage section containing a defective storage element, when the latter is reached, instead of itself, the reserve storage element assigned thereto is included into the drive cycle, and is subjected to a write, read, or erasure process in place of the defective storage element.

2. Description of the Prior Art

In known memories which operate in accordance with this method, in addition to the storage element main component which serves for the primary purpose of storing any items of information, each of the storage elements additionally contains an address array in which its own address is entered. The drive can take place by way of a search procedure using a predetermined address which is compared, on each occasion, with the address read out from the address array of a storage element; in the event of identity, the storage element which is to be driven is then operated in each search process. However, the drive can also take place by means of items of selection data which, for example, indicate the row and column in a coordinate array or cylinder and sector on a magnetic disk. In this case, the address stored in the address array in question serves to monitor a previously-corrected performed drive process.

It continually occurs that the storage medium from which the storage elements for the overall memory, including the storage element main component and address array, is faulty at some locations. As a rule, this applies only to the individual storage elements. A fault of this kind can consist in that a storage element can no longer be recorded upon, read or erased. Therefore, it has already been provided that, in addition to the aforementioned storage sections in the overall memory, a reserve section of reserve storage elements must be provided. These cannot be directly used to form storage sections in the same way as the storage elements. From the latter it is possible to form storage sections consisting of arbitrary members of storage elements. A storage section is formed for a specific storage purpose, e.g. for storing a program or a subsidiary program or data relating to a switching network configuration or the like.

Since the storage volume requirement generally differs from storage purpose-to-storage purpose, it is possible to select the number of storage elements in the formation of a storage section. A memory access device has free access to the storage elements from which, depending upon the storage volume requirement, it conforms storage section of arbitrary size regarding the number of storage elements which are related in terms of address. Here, an exclusion consists of the reserve storage elements of the reserve section. Therefore, the memory access device is denied free access to the reserve storage elements.

Rather, in the event of a defect in a storage element, the reserve storage element can be individually assigned thereto, and, in fact, as a substitute for the storage capacity which has become lost as a result of the defective storage element. In this assignment procedure, one reserve storage element is always individually assigned to a defective storage element. For this purpose, it is provided that a pointer character be stored in the address array of a storage element when the storage element in question is defective, and that it should be assigned a reserve storage element in that the address of the defective storage element is entered into the address array. If the storage elements are successively driven for the execution of a write, read or erasure process, and if in so doing the defective storage element is reached, during the reading of its address array the pointer character simultaneously appears, therefore indicating the existence of the defect and resulting in the fact that, instead of this storage element, the reserve storage assigned thereto is driven. This is carried out by driving the reserve section, and by reading the address arrays of the reserve storage elements in succession. In the event of identity between the address which has currently been read with the address of the defective storage element in question, this search procedure is terminated, since the reserve storage element assigned thereto has been found, and therefore has been driven by this search procedure.

The previously-described system of driving a reserve storage element assigned to a defective storage element is a time-consuming procedure. Furthermore, it is possible that not only the main component of the storage element, but also its address array may be faulty. In this case, the address array cannot be read or the fault will manifest in the result of the reading. Then, the described search is performed in the reserve storage section. The pointer character may then be absent, or can be falsely simulated. The one or the other of these two faults can result in the fact that the defective storage element, which has already been assigned a reserve storage section, is wrongly reassigned a reserve storage element, or that the reserve storage element assigned to a defective storage element is searched for when as assignment required for this purpose has not taken place. In the final analysis, all such misfunctions, i.e. a double assignment of reserve storage elements to a defective storage element or the absence of such assignment, are, in fact, detectable. However, all the additional procedures required for purposes of rectification involve additional expense for corresponding programs and, in particular, cost time, therefore slowing down the procedures flows in the drive of the storage elements of a storage section.

In the event of defects of this kind, firstly read repetitions are carried out, which as is known can be extremely time consuming. Here, the same storage element is redriven. Such read repetitions must be performed not only on the first occasion of a fault in the address array, but also when the effective storage element (defective in the address array) has already been assigned a reserve storage element at an earlier time, this must be repeated on each occasion. If such read repetitions do not lead to a clearly-defined, utilizable read result, in the reserve section a search for a reserve storage element already assigned to the respective storage element is begun, since it is possible that the defect which has occurred has already been recognized on the occasion of an early case operation and has lead to a corresponding assignment procedure. If, however, no reserve storage element bearing the address of the defective storage element is found, this implies that an assignment procedure of this type has not yet taken place and must be performed at the time in question. These procedures are all extremely complicated and time consuming.

It is also known that faults of a sporadic type additionally occur, i.e. faults which occasionally occur at random do not repeat. Such defects can be produced, for example, as a result of traveling particles of dust. If, during operation, a sporadic fault of this type has lead to the assignment of a reserve storage element to a defective storage element and a corresponding item of information has been stored in the reserve storage element, and if this defect has disappeared at random on the next occasion of operation, the item of information in question is read not only from the reserve storage element but from the original storage element to which the reserve storage element has already been assigned on the earlier occasion of operation, i.e. during the earlier processing. This can lead to the fact that a false item of information is read.

Furthermore, a defect can consist in that a storage element initial character, which marks the beginning of a storage element, has become illegible. In the case of a defect of this kind, the search for this storage element, initial character can be continued and simulated by a later different character which can be interchanged with the storage element, initial character as a result of which the entire storage process takes place with a delay relative to the address array in question and consequently leads at random to false results, or else an interchangeable storage element initial character of this kind is not discovered and a time monitoring process signals that the search procedure has not lead to a result. Defects of this kind possess unpredictable and virtually uncontrollable consequences. Therefore, it has already been proposed for a memory arrangement operating in accordance with the method described above, that in an additionally provided special memory, the addresses of all the defective storage elements be collected and stored in individual assignment to the addresses of the assigned reserve storage elements. Furthermore, during a write, read or erasure process of a storage element, on the basis of the selection address of the next storage element to be driven, which address is obtained from the selection address of the storage element in question as a result of the address succession, by way of a search procedure in the special memory it should be checked whether the selection address of this storage element is stored as defective. Furthermore, and in the case of a positive result, the selection address of the reserve storage element in question, which is stored in association therewith, should be read, and the reserve storage element should be driven and should perform the write, read or erasure process. If, under these conditions, a storage arrangement having relatively rapid access is used as a special memory, on each occasion during the processing (read, write or erasure) or a storage element, the selection address of the next storage element to be driven can be obtained on the basis of the address section, whereupon the special memory can be searched to establish whether this selection address is stored therein. If so, the drive address, stored together with this selection, i.e. the drive address of the defective storage element, of the reserve storage element assigned to the defective storage element, is read and is used for the next drive operation of the current processing in place of the selection address of the defective storage element. If this is not so, which however is not ascertained until the entire contents of the special memory has been searched, the drive takes place with the drive address of the storage element in question, since it has not been assigned a reserve storage element because of the fact that it is not defective.

In comparison to the storage method described in the introduction, the above-described proposed more novel method of storage results in a substantial gain in time. However, this is heavily dependent upon how fast the read processes can be handled in the special memory. This, in turn, is dependent not only upon the operating speed of the special memory, but also upon its level of fullness, i.e. a varying and non-predictable influencing parameter. If the length of the read procedures in the special memory exceeds the duration of the processing (read, write and erase) of a storage element, time losses occur. The processing procedure of the next storage element cannot begin properly on each occasion. In magnetic disk memories or magnetic drum memories in which it is well known that the storage medium constantly circulates, this can have a negative outcome inasmuch as in such cases it is necessary to wait for a complete rotation of the disk or drum, which substantially increases the time losses.

SUMMARY OF THE INVENTION

Therefore, the object of the present invention is, in association with the assignment of reserve storage elements to defective storage elements, to further simplify control of all the procedures required for the drive storage elements and, where applicable, of reserve storage elements, and to shorten the time expense in question, and in particular to render it independent of the extent of the currently-defective storage elements.

The above object is achieved, according to the present invention, in that in a first special memory there are stored both the selection addresses of all the defective storage elements and, in assignment to each of these individual selection addresses, the selection addresses of the assigned reserve storage element, that when a memory section is driven by way of its start address, the selection address of its first storage element and a number of elements indicating the number of storage elements combined therein, simultaneously, on the basis of this start address and the number of elements from the special memory, which represents a first special memory, the drive addresses of the defective storage elements, assigned to the driven memory section, together with the selection addresses of the reserve storage element already assigned thereto, are read and stored in a second special memory. These are classified in accordance with the succession of the selection addresses of the defective storage elements. In a third special memory containing a series of memory positions, the number of which matches the maximum number of storage elements provided in each storage section, and each of which is individually assigned to the storage elements of a storage section for the time during which it is driven, and which in particular represent one-bit storage positions, on the basis of the start address and on the basis of the selection addresses, stored in classified fashion in the second special memory, of the defective storage elements, in each of the storage positions of each storage element of the driven storage section, by way of an item of defective/non-defective information, the information is stored as to whether the storage element in question is defective or not. During the successive drive of the storage elements of the storage section in question, in accordance with the items of defective/non-defective information successively read from the third special memory, at the same time, when an items of "non-defective" information is received, the selection address of the storage element in question is read in accordance with the address succession, or in the event of an item of "defective" information is received from the selection address of the reserve storage element assigned to the defective storage element in question is read, and, with the one or the other selection address, this storage element or the reserve storage element is driven.

BRIEF DESCRIPTION OF THE DRAWING

Other objects, features and advantages of the invention, its organization, construction and mode of operation will be best understood from the following detailed description, taken in conjunction with the accompanying drawing on which there is a single FIGURE which is a schematic representation of apparatus for carrying out the method of the present invention.

DESCRIPTION OF THE PREFERRED EMBODIMENTS

Referring to the drawing, a magnetic disk, which rotates at a constant speed of revolutions per second about an axis A in the direction of rotation r, will be assumed to be subdivided into sectors M1-M12 each comprising 30°. A central component N is not provided for storage purposes (similarly to the central component on a phonograph record). A write-read head K serves in a known manner to write, i.e. store data, and to read, i.e. retrieve such data. Retrieval can simultaneously effect erasure. A write process can also be preceded by an erase process. Erasure can also take place without the reception of stored data and retrieval can also take place without erasure.

The head K, which can be pivoted by an arm L about a pivot B by way of a control device C and a rod D, can be set at one of the magnetic disk tracks for the execution of a read and/or write and/or erase process. Therefore, a magnetic disk track extends concentrically about the axis A (in contrast to the grooves on a phonograph record which are spiral shaped). A magnetic track therefore forms a circular ring. The location of each magnetic track is determined by its diameter (inner or outer diameter or mean diameter or circular ring radius). In accordance with the latter, the head K can be adjusted to a specified magnetic track by way of the control device C. The components C, D, L, B which carry the head K and determine its spatial location are also referred to as a positioning device. It should also be noted that both sides of a magnetic disk serve to store data, and that, accordingly, two heads (one on each of the two disks) are provided. As can be seen from the drawing, a magnetic disk is divided into a number of sectors. In the present exemplary embodiment, twelve sectors M1-M12 are provided. A storage element, e.g. E1/E2 is specified by the sector in question, e.g. M1, and the "cylinder" in question. This is to be understood as a specific circular ring defined by its diameter (or radius), the circular rings therefore being referred to as "cylinders". The particular side of the disk in question is also of significance. Therefore, in respect of each diameter and sector there are two storage elements, one on one side of the disk and one on the other side. However, this will not be referred to in the remainder of the description since this aspect is not of decisive significance to the invention. Therefore, from here forwards, the description will refer to the procedures relating one one side of the disk.

A storage element, e.g. E1/E2, in each case consists of an address array, e.g. E1, and a storage element main component, e.g. E2, which serves to store any items of information. This main component will be referred to hereinbelow as "storage array" instead of "address array". An address array and a storage array therefore always form a storage element.

The above-described subdivision of the overall memory, which basically consists of the magnetic disk, into a plurality of storage elements is also referred to as "formatting".

The magnetic disk is divided into a number of sectors M1-M12. The magnetic disk is also divided into circular rings which are referred to as cylinders. A section of the overall memory defined by a circular ring diameter (or circular ring radius) and by a sector (and also by one or the other side of the magnetic disk) in each case represents a storage element. In practice, such a storage element is also referred to as a "store sector".

The overall memory used in the described method of storage for a storage device used in telecommunication systems, in particular a telephone exchange system, can consist of a different form of storage medium, e.g. a magnetic drum, in place of a magnetic disk. Here again, the overall periphery of the drum is arranged in a number of sectors. In a case of this kind, the magnetic tracks do not represent circular rings, but are cylindrical, and the various magnetic tracks all possess the same diameter. The use of the term "cylinders" and comes from respect of magnetic tracks is known in magnetic drum storage technology in which it is in common usage. The remainder of the description will not revert to the represented exemplary embodiment of a magnetic disk memory.

As known, a plurality of storage functions exist in practical operation in a telecommunication system, e.g. a telephone exchange system. Apart from extremely brief storage procedures, e.g. for the storage of dialed information for establishing connections, storage functions exist for purposes in which information which is to be stored must be held for longer periods of time. The storage device explained herein with respect to the exemplary embodiment is particularly suitable for such purposes.

The storage functions which exist in the case of the various storage purposes, each correspond to a specific, required storage volume which can differ considerably in size from one storage function to another. In order to exploit the total storage capacity available, in each storage job storage sections are not formed in accordance with the largest storage volume requirement occurring in each storage job, but for this purpose the overall memory is subdivided, in the described fashion, into storage elements, and in respect of each storage job a number of storage elements corresponding to the storage volume requirement in question are combined to form a storage section. Therefore, this number can be selected, and in fact in accordance with the storage volume required for the storage job in question. Therefore, storage sections, of specified size, consisting of co-related storage elements, are formed by a selectable number of storage elements. This co-relation between storage elements within a storage section is governed by addresses of the storage elements by which they are driven. These addresses can each consist of items of data which govern the setting of the positioning device, and can therefore each indicate the circular ring radius and the sector of the magnetic disk (and the side in question of the magnetic disk). These items of selection address data of a storage element lead to the fact that the start of the desired storage element is brought under the head K which is achieved in a known manner by appropriate pivoting of the arm L and rotation of the magnetic disk. As already described, each storage element consists of an address array and the storage array. The storage array serves to receive those items of information which have been supplied in the storage job in question, are to be stored, and to be read at a later time. In contrast, the address array of a storage element serves to receive its own address. This address can be identical with the already described address of each storage element which represents the physical address indicating the location of a storage element on the magnetic disk. However, the address stored in the address array of each storage element can also be of different composition, e.g. can consist of a serial number. The address stored in the address array of a storage element serves to read this address when a storage element has been driven, by way of which it can be checked whether this drive has lead to the desired goal, i.e. whether the storage element to be driven has actually been driven.

As proven by practical experience, it continually occurs that punctiform defects occur in the storage medium, indicating that a storage element can no longer be recorded on and/or read and/or erased. Such a defect can occur in the storage array and/or in the address array of a storage element. These defects occur sporadically and are generally irregularly distributed over the overall memory.

If, in the described manner, storage sections of specified size are composed of storage elements which are co-related in respect of their drive and can be individually successively driven by way of addresses, it can occur that, in such a series of storage elements co-related in respect of drive, one of the storage elements is subjected to a defect. In order to eliminate the defects of such a fault in the storage system (storage sections of specified size are to be formed from storage elements which are co-related in respect of their drive and can be individually successively driven by way of addresses), a reserved section of the overall memory contains reserve storage elements, e.g. R6, R7, R8 . . . A reserve section of this kind can comprise a part of the storage elements of a circular ring, or all of the storage elements of a circular ring, or a plurality of storage elements of a circular ring ("cylinder"). The reserve section of the overall memory can consist of an innermost circular ring or the innermost circular rings or the outermost circular rings on the magnetic disk of a magnetic disk memory. In the present example, the storage elements of the innermost two circular rings (cylinders) of the illustrated magnetic disk will be assumed to be provided as reserve storage elements and to form the reserve section.

The reserve storage elements ( . . . , R6, R7, R8, . . . ) contained in the reserve section of the overall memory are protected from the direct access, which serves to form the storage sections which are co-related in respect of drive, by the control device (not shown in detail) of the described storage device. Therefore, these storage elements are excluded from the formation of the storage sections which are co-related in respect of drive. Rather, these storage sections serve as a substitute in the event of a defect in one of the other storage elements.

If the situation occurs that one of the storage elements which do not form part of the reserve section exhibits a defect in the described manner, this is assigned a reserve storage element, and in the drive of the storage elements of a storage section, when its storage elements are successively driven, and when it is the turn of the defective storage element, the reserve storage element assigned thereto is driven instead. For this purpose, the drive addresses of all the storage elements which are combined to form a storage section are stored in a drive memory G which is assigned to a memory drive device H of the storage device represented on the drawing. Therefore, these drive addresses serve consecutively to drive the storage elements of a storage section. In known arrangements, for the defective storage element the drive address of the reserve storage element assigned thereto has been stored in the address array of the defective storage element. When the defective storage element in question has been reached, instead of its own address, the address of the reserve storage element assigned thereto has been read from its address array, whereupon the reserve storage element has been driven. However, difficulties occurred when the defect in question was located not only in the storage array or in the storage array of the storage element in question, but in its address array. Only when this situation does not exist, therefore when a defect occurred in the storage array of a storage element, was it possible in the known arrangements that the individual successive drive of the storage elements of a storage section containing a defective storage element, when the latter was reached, the reserve storage element assigned thereto could be included in the drive cycle instead of the defective element, and subjected to a write/read/erase procedure instead of the defective storage element.

In the storage devices of the known type, and likewise in the storage device in accordance with the present invention as described with reference to the drawing, there is therefore provided a memory drive device H which contains a drive memory G. In respect of each storage job, this memory stores the drive address which designates the first storage element of a storage section, and the number of storage elements assigned to the storage section in question. Therefore, the drive memory G does not need to store all the drive addresses of all the storage elements which have been combined to form a storage section, but in fact only the start address and the number of storage elements in respect of each storage section. On the basis of these items of data, the memory drive device H can successively drive the storage elements of a storage section.

If, in the exemplary embodiment in accordance with the invention, a defect now occurs in a storage element indicating that the storage element in question can no longer be recorded on and/or read and/or erased in a fault-free manner (where the fault can relate to its storage array and/or its address array), the selection address of the storage element which has been established as being defective is stored in a special memory T. In the form of two columns T1a–Tna and T1b–Tnb, this special memory contains storage cells T1a–T1nb which are assigned to one another in pairs, e.g. in the form of the storage cells T1a and T1b. This special memory stores the selection addresses of all of the defective storage elements, and in assignment to each of these, the selection addresses of the assigned reserve storage element. Therefore, for example, if it is established that the storage element E1/E2 is defective, it is assigned a reserve storage element, e.g. the storage element R7. The selection address of the defective storage element E1/E2 will now be assumed to be stored in the storage cell T2a, and the selection address of the reserve storage element assigned thereto, e.g. reserve storage element R7, it will be assumed to be stored in the storage cell T2b, assuming that the storage cells T1a and T1b are already being used otherwise to store selection addresses.

As already described, for the drive of each storage section, the memory drive device H stores the start address for the first storage element and the number of storage elements assigned to the storage section in question. From this, the memory drive device H forms successively the selection addresses of the individual storage element which are combined in the storage section in question, which it uses individually, in turn, to drive each of the storage elements. If the memory drive device H reaches a storage element which has already been recognized as being defective, it must be ensured that in place of this storage element the reserve storage element assigned thereto is driven. For this purpose, the selection addresses of a storage element which has become defective and of the reserve storage element assigned thereto are stored in the two storage cells, assigned to one another in the special memory T in the described manner. As can be seen from the drawing, this special memory represents the first of three special memories T, U and V. The first special memory T stores selection addresses of storage elements which have been defective, together with the selection addresses of individually assigned reserve storage elements. This storage takes place in respect of the storage cells T1a–Tna and accordingly also in respect of the storage cells T1b–Tnb in the random sequence of the occurrence of and recognition of defective storage elements. Therefore, the first special memory T stores the selection addresses of defective storage elements in an unclassified sequence.

In addition to the first special memory T, the second special memory U and the third special memory V are provided. The second special memory U is of similar construction to the first special memory T and, like the latter, contains storage cells U1a–Uma and U1b–Umb arranged in pairs. However, the number of storage cells in the second special memory U is smaller than the number of storage cells in the first special memory T.

If, with the assistance of the memory drive device H, a specific storage section is driven on the basis of the start address and the number of storage elements combined in the driven storage section, the memory drive device uses these items of data not only to drive the memory, but it also transmits these items to the first special memory T. The special memory also possesses a memory control unit P. One of the functions of the memory control unit is to input the selection addresses of defective storage elements, together with the selection address of the reserve storage elements assigned thereto, into the storage cells of the first special memory T, as has already been described. However, when a storage section is driven by the memory drive device H, the memory control unit P also receives the start address and information concerning the number of storage units combined in the storage section in question. On the basis of this start address and this number, the memory control unit P checks all of the selection addresses, stored in the storage cells T1a–Tna, of the defective storage elements to establish which of these defective storage elements is related to the newly driven storage section. The memory control unit P therefore reads out of its storage cells T1a–Tnb the selection addresses of all those defective storage elements which are assigned to the newly driven storage section. At the same time, it also always reads the selection addresses of the reserve storage element assigned to the storage element in question. These selection addresses, together with the selection addresses of the defective storage element and the selection addresses of the reserve storage element assigned thereto, are transferred by the memory control unit P to the second special memory U. The memory U includes a memory control unit Ux which enters these selection addresses into storage cells U1a–Unb of the second special memory U, and in fact in such a manner that, for example, the selection addresses of a defective storage element is entered into the storage cell U1a, and the selection address of the reserve storage element assigned thereto is entered in the storage cell U1b. During this transmission and storage of the selection addresses to and in respectively the second special memory U, the selection addresses which are assigned to the storage section which is to be newly driven are classified. These are classified in accordance with the sequence of the storage elements, which have become effective, within the storage section in question. This classification process can be undertaken by the memory control unit P or the memory control unit Ux in a manner known per se.

Therefore, when a storage section is newly driven, at the beginning of the selection process the drive addresses of all of the defective storage elements which are assigned to this storage section are transferred into the second special memory U, classified in accordance with the sequence in which they are driven, where they are stored together with the selection addresses of the assigned reserve storage elements. Therefore, whereas the selection addresses of all of the storage elements which have become defective are stored in the first special memory T, it is only when a storage section begins to be newly driven at the selection addresses of the defective storage elements contained therein are stored in the second special memory U (in each case together with the selection address of the reserve storage element individually assigned to a defective storage element).

As already mentioned, the third special memory V is also provided. This comprises a shift register containing storage positions v1–vy. Each storage position serves to receive an item of one bit information. At the beginning of a drive process relating to a storage section by the memory drive device K, and following the above-described process of transferring selection addresses from the first special memory T to the second special memory U, for each of the storage elements assigned to the newly driven storage section the memory control unit Ux emits an item of one-bit information to the third special memory V. From the memory drive device H the memory control unit U receives the relevant start address of the storage section and the number of storage elements which are assigned to this storage section. The memory control unit Ux now successively checks through the selection addresses of the relevant storage elements of the storage section which is to be driven. On the basis of the selection addresses, stored in the storage cells U1a–Una, of the storage elements which have become effective, the memory control unit Ux recognizes which of the storage elements assigned to the storage section in question is defective and which is not. Accordingly, for each of the storage elements assigned to the driven storage section, the memory control unit Ux emits an items of "defective"/"non-defective" information to the third special memory V. Here, these items of information are stored consecutively in the storage positions v1–vy. When this process has been concluded, the storage positions v1–vy each contain an item of information for each storage element which is assigned to the driven storage section. This information relating to each storage element indicates whether or not the storage element in question is defective or not.

If the memory drive device H now begins the drive procedures in order to drive the individual storage elements assigned to the storage section in question, it successively receives from the third special memory V the items of "defective"/"non-defective" information which relate to the individual storage elements of this storage section. With the assistance of these items of information, the memory drive device H recognizes whether the storage element which is to be driven is defective or not. If the storage element which is to be driven is non-defective, the storage elements in question are driven in the described fashion in accordance with the succession of the selection addresses governed by the start address and the number of storage elements per storage section. If, however, an item of "defective"/"non-defective" information relating to a storage element indicates that the storage element in question is defective, the memory drive device H emits the address of the defective storage element, which is next in turn in accordance with the address succession, to the second special memory U, and with the address of the defective storage element requests the second special memory U to transfer the selection address of the reserve storage element, assigned to the defective storage element in question in the specified manner, to the memory drive device H. For the next drive procedure, the memory drive device H now possesses the reserve storage element drive address which corresponds to the defective storage element which is next in turn in accordance with the address succession, and on the basis of this selection address drives the assigned reserve storage element in question.

Therefore, the first special memory stores both the selection addresses of the defective storage elements and, in assignment to each of these selection addresses, the selection addresses of the assigned reserve storage elements in question. When a storage section is driven by way of its start address and the elemental number indicating the number of storage elements combined therein, the selection addresses of the defective storage elements assigned to the driven storage section are read from the first special memory, together with the selection addresses of the reserve storage elements already assigned thereto, and, classified in accordance with the succession of the drive elements of the defective storage elements, are stored in the second special memory. Thus, the third special memory possesses as many storage positions as the maximum number of storage elements which a storage section can comprise. The number of storage positions in the third special memory is therefore matched to this maximum number. For the duration of the drive of a storage section, the storage positions of the third special memory are each individually assigned to the storage elements thereof. The storage positions of the third special memory need only represent one-bit storage positions. Therefore, this special memory can be designed in a particular simple manner as a shift register. In the third special memory, on the basis of the start address and on the basis of the selection addresses, stored in a classified fashion in the second special memory of the defective storage element, in each of the storage positions in respect of each storage element of the driven storage section, by way of an item of "defective"/"non-defective" information it is stored whether the storage element in question is defective or not. Simultaneously to the successive drive of the storage elements of the storage section is question by the memory drive device H, in accordance with the items of "defective"/"non-defective" information likewise successively read from the third special memory, when an item of "non-defective" information is received, the selection address of the storage element in question is read in accordance with the address succession, and when an item of "defective" information is received, the drive address of the reserve storage element assigned to the defective storage element in question is read from the second special memory. This storage element or this reserve storage element is then driven by the memory drive device H with the one or the other of these two drive addresses.

Although I have described my invention by reference to a particular illustrative embodiment, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method of operating a rotating storage device on which storage elements which are co-related in respect of their jobs are combined into storage sections for sequential access, in which each of the storage sections includes a selection address, in which reserve storage elements are provided and have their own respective selection addresses, and on which some of the storage elements are determined to be defective, comprising the steps of:

storing the selection addresses of the first storage element to be accessed of a sector, as a start address, along with a number indicating the number of elements in that sector, in a drive memory;

assigning a respective reserve storage element to each defective storage element;

storing the selection address of each defective storage element in a first special memory along with the selection address of its assigned reserve storage element;

reading from the first special memory the selection addresses of the defective storage elements and the selection addresses of their respective assigned reserved storage elements, classifying the read selection addresses in accordance with the succession of the selection addresses of the defective storage elements, and storing the classified selection addresses in a second special memory;

storing in a third special memory a one-bit defective/non-defective information for each storage element of a storage sector on the basis of the start address and the stored classified selection addresses of the defective storage elements; and driving each storage element of the storage sector in accordance with the start address and number stored in the drive memory while substitute driving the reserve storage elements in place of their assigned storage elements in accordance with the respective defective/non-defective information, whereby the assigned reserved storage elements are included in the drive cycle in place of the respective defective storage elements.

2. Apparatus for operating a rotating storage device on which storage elements which are co-related in respect of their jobs are combined into storage sections for sequential access, in which each of the storage sections includes a selection address, in which reserved storage elements are provided and have their own respective selection addresses, and on which some of the storage elements are determined to be defective, comprising:

a drive memory for storing the selection address of a first storage element to be accessed of a sector, as a start address, along with a number indicating the number of elements in that sector;

means for assigning a respective reserve storage element to each defective storage element;

a first special memory for storing the selection address of each defective storage element along with the selection address of its assigned reserve storage element;

a second special memory for reading from the first special memory the selection addresses of the defective storage elements and the selection addresses of their respective assigned reserve storage elements, classifying the read selection addresses in accordance with the succession of the selection addresses of the defective storage elements, and storing the classified selection addresses;

a third special memory for storing a one-bit defective/non-defective information for each storage element of a storage sector on the basis of the start address and the stored classified selection addresses of the defective storage elements; and drive means connected to said drive memory and to said first, second and third special memories for driving the storage element of the storage sector in accordance with the start address and the number stored in the drive memory while substitute driving the reserve storage elements in place of their assigned storage elements in accordance with the respective defective/non-defective information, whereby the assigned reserve storage elements are included in the drive cycle in place of the respective defective storage elements.

3. The apparatus of claim 2, wherein:
said third special memory is a shift register.

4. The apparatus of claim 2, wherein:
said first special memory comprises pairs of storage positions for the selection addresses of a defective storage element and its assigned reserve storage element.

5. The apparatus of claim 2, wherein:
said second special memory comprises a pair of storage positions for the selection addresses of a defective storage element and its assigned reserve storage element.

* * * * *